United States Patent [19]
Deal

[11] Patent Number: 4,888,769
[45] Date of Patent: Dec. 19, 1989

[54] TDMA TERMINAL CONTROLLER

[75] Inventor: Joseph H. Deal, Santa Clara County, Calif.

[73] Assignee: TIW Systems, Inc., Sunnyvale, Calif.

[21] Appl. No.: 298,829

[22] Filed: Jan. 18, 1989

Related U.S. Application Data

[63] Continuation of Ser. No. 73,847, Jul. 13, 1987, abandoned, which is a continuation of Ser. No. 805,616, Dec. 6, 1985, abandoned.

[51] Int. Cl.$^4$ ........................................... H04B 7/185
[52] U.S. Cl. ..................................... 370/50; 370/85.1; 370/95.3
[58] Field of Search ........................ 370/50, 75, 79, 80, 370/85, 94, 97, 104, 124, 120, 121; 375/8; 455/12

[56] References Cited

U.S. PATENT DOCUMENTS

| | | | |
|---|---|---|---|
| 3,879,580 | 4/1975 | Schlosser et al. | 370/104 |
| 4,312,063 | 1/1982 | Warner | 370/104 |
| 4,355,388 | 10/1982 | Deal, Jr. | 370/104 |
| 4,581,736 | 4/1986 | Dobyns et al. | 370/104 |
| 4,630,263 | 12/1986 | Townsend et al. | 370/85 |

*Primary Examiner*—Douglas W. Olms
*Assistant Examiner*—Melvin Marcelo
*Attorney, Agent, or Firm*—Flehr, Hohbach, Test, Albritton & Herbert

[57] ABSTRACT

A TDMA terminal is disclosed having a plurality of terrestrial interface ports, and a plurality of modems for modulating preamble and port data onto a carrier and demodulating the received data transmitted via a satellite from the carrier wherein the interface ports and modems are fully connected over a common bus arrangement. The TDMA terminal controller defines the sequence of transmission (TX) and reception (RX) of information through these multiple ports and modems. The control sequencing selectively activates the ports and modems to accommodate current traffic requirements. This is achieved by presenting clock timing signals and port address signals repetitively to the ports during each transmission frame to couple the ports to the bus for transmit and receive information during the allocated burst intervals. This sequencing system adds or deletes bursts, for selectively defining the ports and modems to be coupled to the bus. clock intervals ("phases") are added to or deleted from the addressing sequence to modify the timing of the transmission frame; in this way the frame is centered relative to the transmission and receive aperture, in order that terminal the remains fully synchronized with the transmission of information.

15 Claims, 15 Drawing Sheets

TDMA TERMINAL ARCHITECTURE

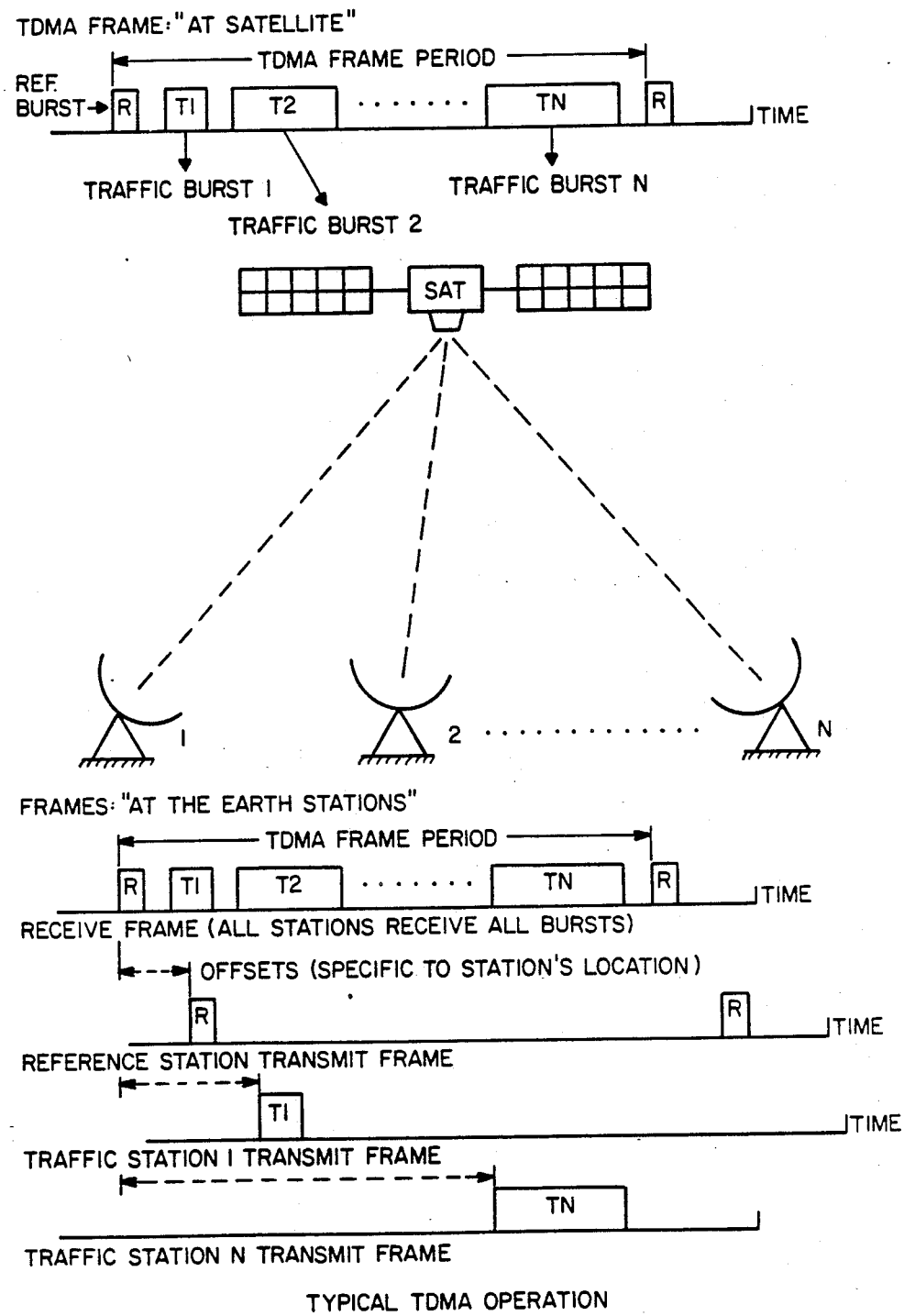
TYPICAL TDMA OPERATION
FIG_1

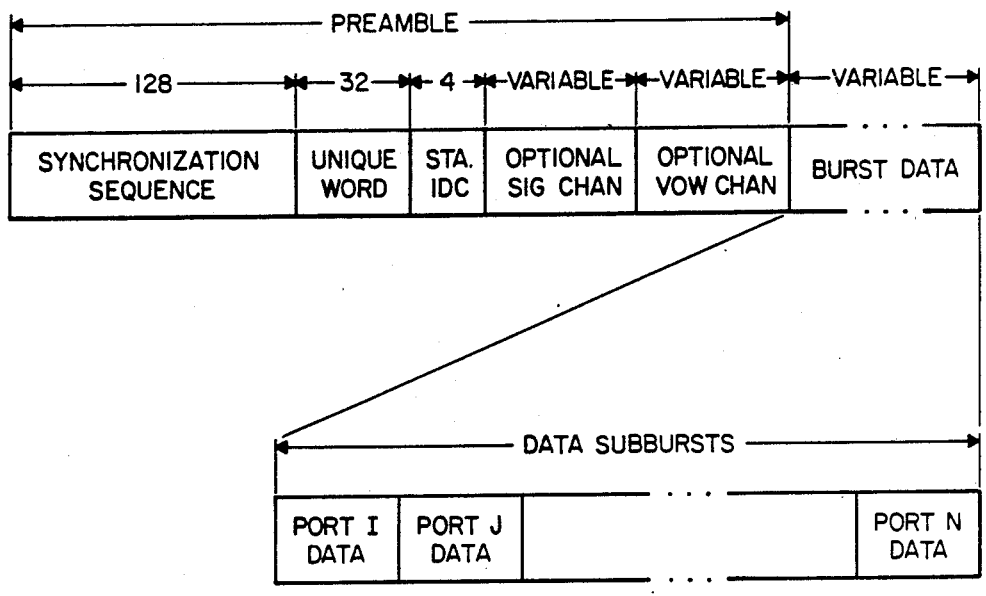
TYPICAL TDMA BURST TI STRUCTURE
FIG_2
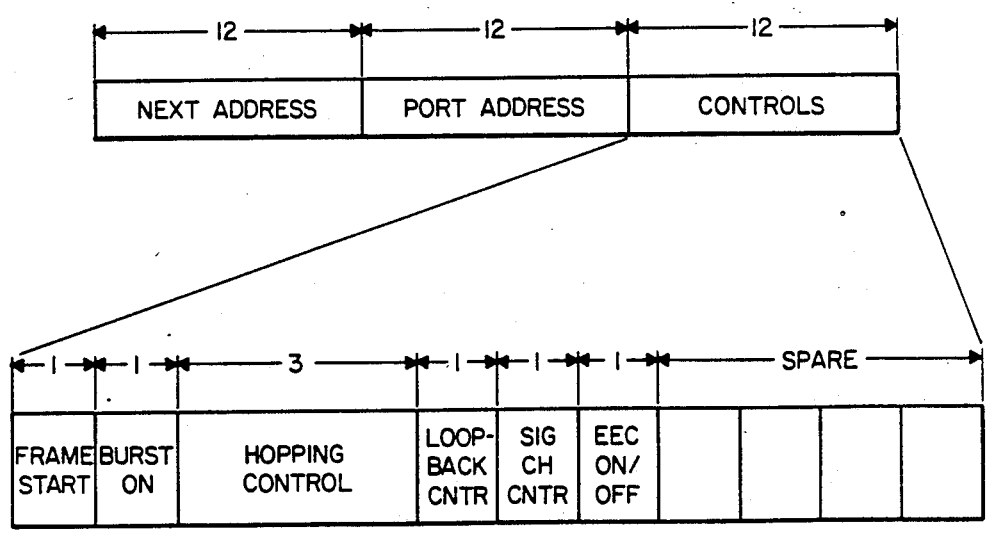
MICROCONTROL WORD FIELD ASSIGNMENTS
FIG_7

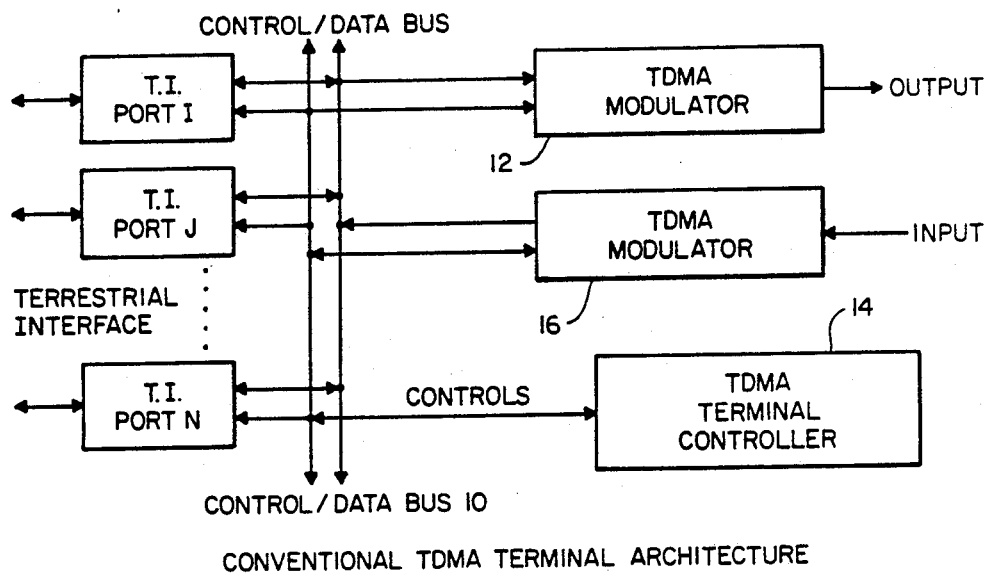
CONVENTIONAL TDMA TERMINAL ARCHITECTURE
FIG_3
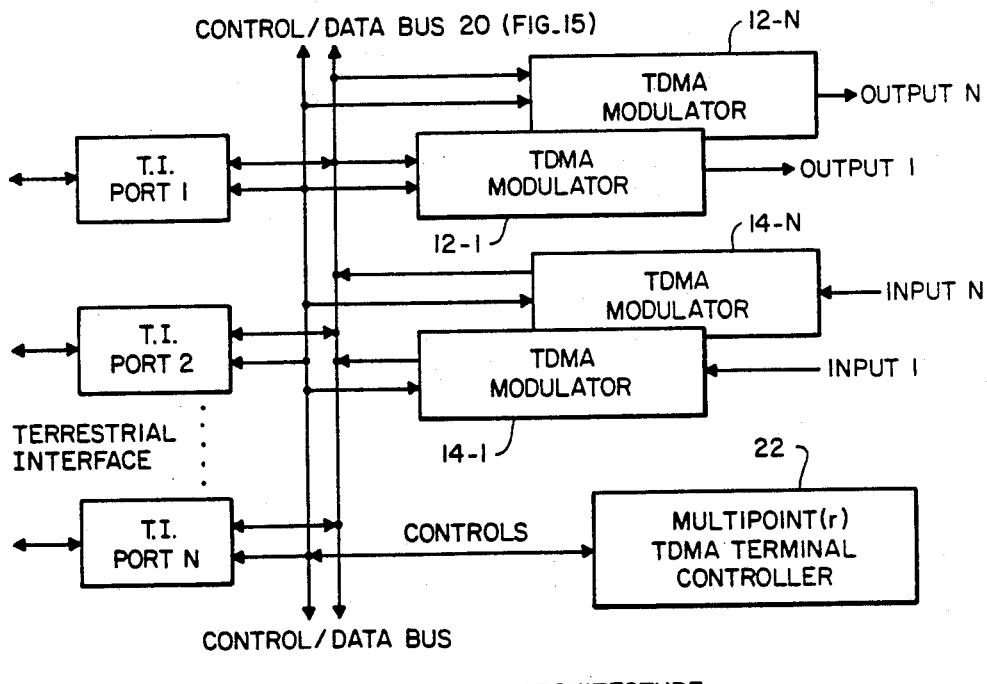
TDMA TERMINAL ARCHITECTURE
FIG_4

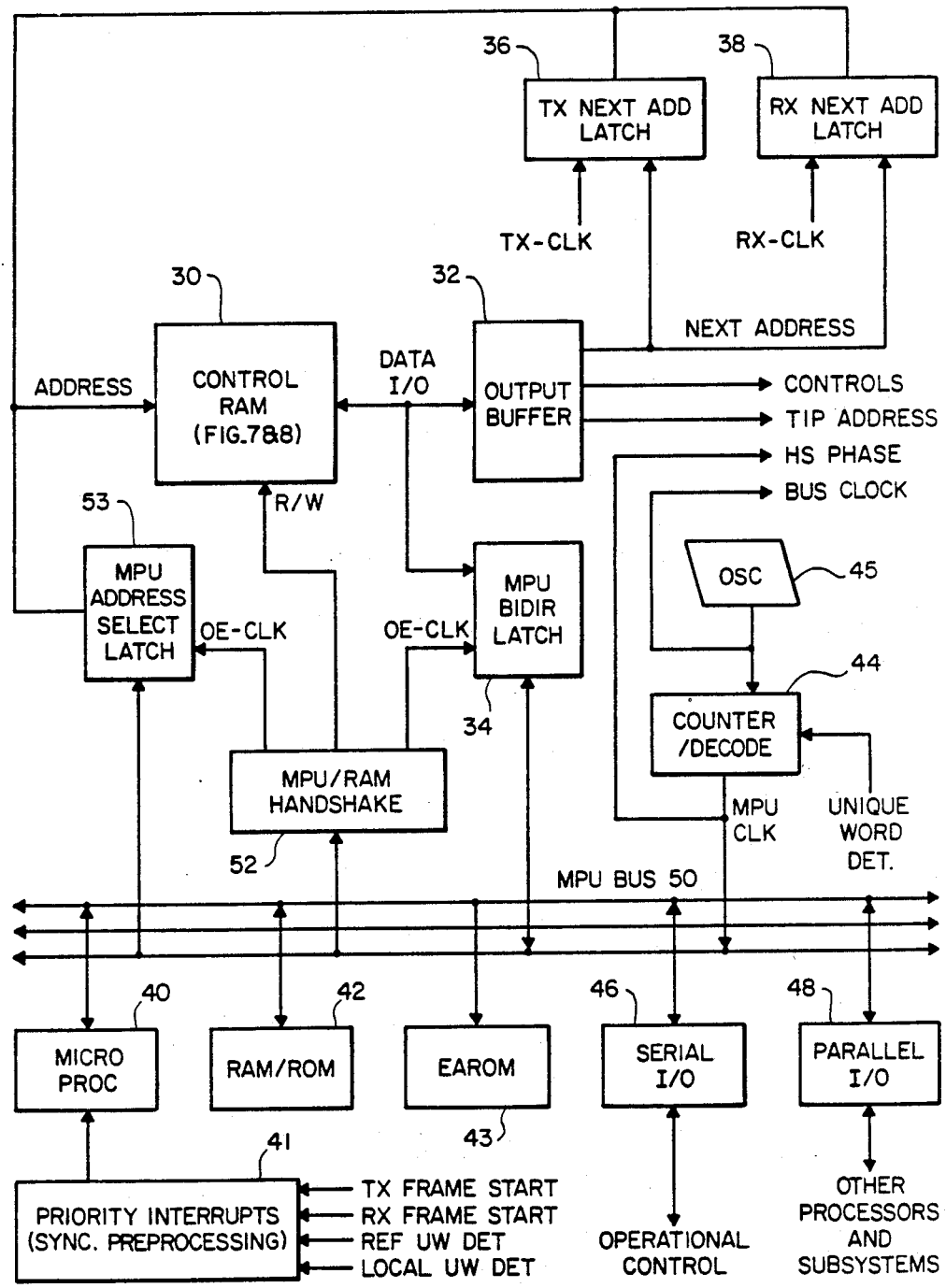
MULTIPOINT TDMA CONTROLLER GENERAL BLOCK DIAGRAM
FIG_5

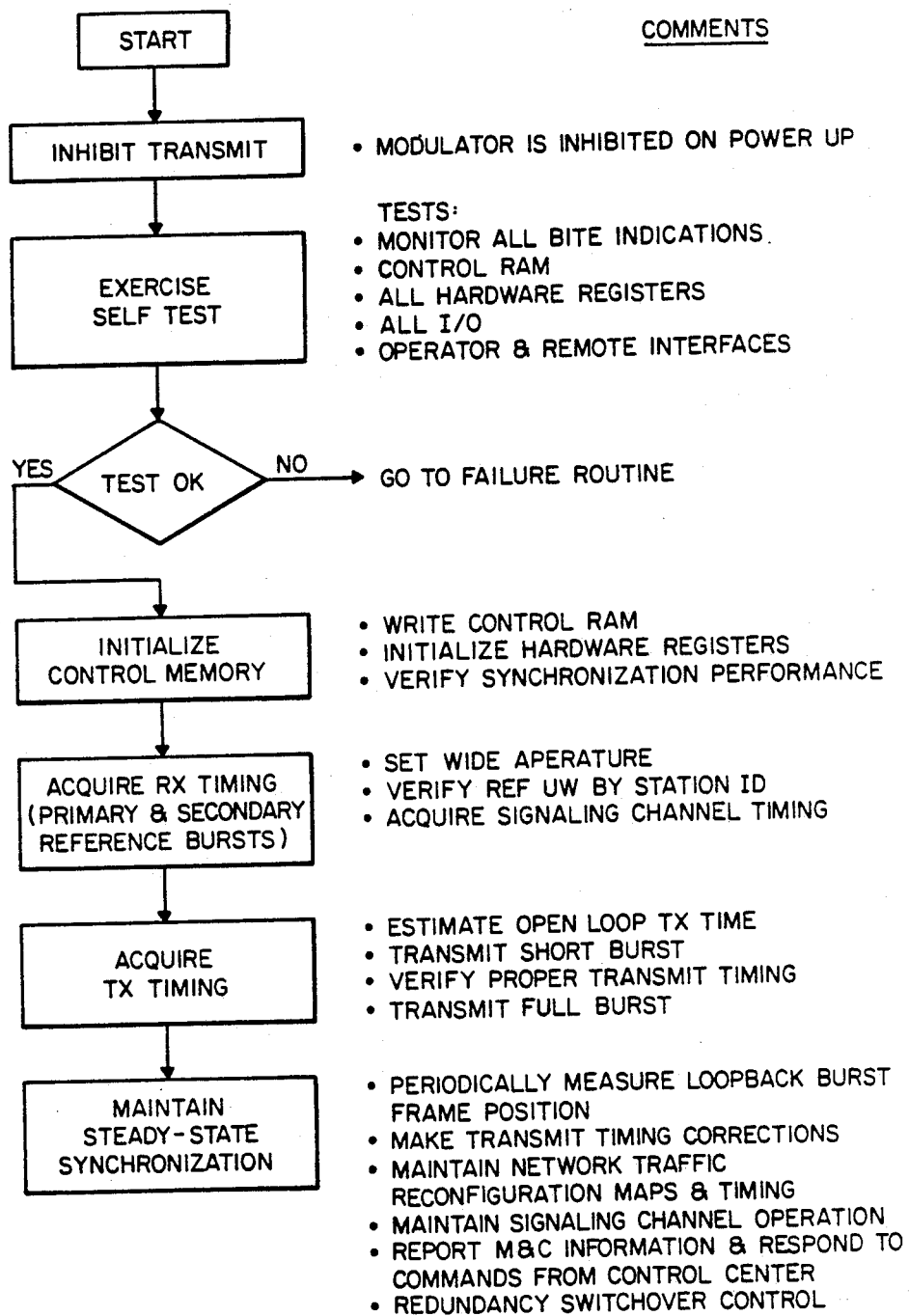
FIG_6

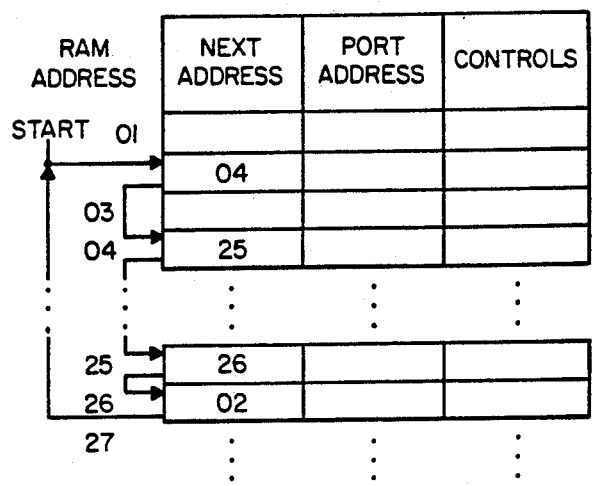
TYPICAL CONTROL RAM LINKED LIST SEQUENCE
FIG_8
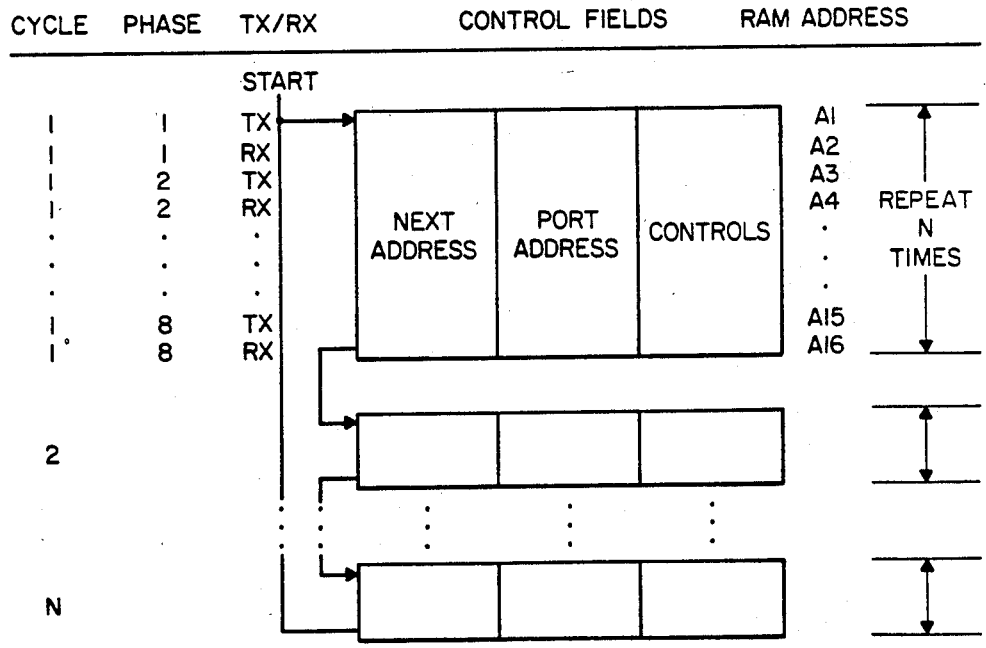
VARIATION ON THE SEQUENCER LINKED LIST
FIG_13

CLOCK PERIODS:
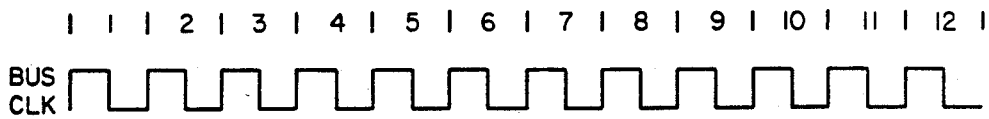
TIP ADDRESSING:
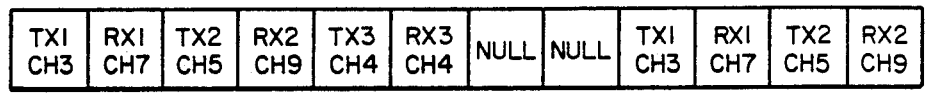
TX/RX SELECT TIMING: (TX = TRANSMIT / RX = RECEIVE)
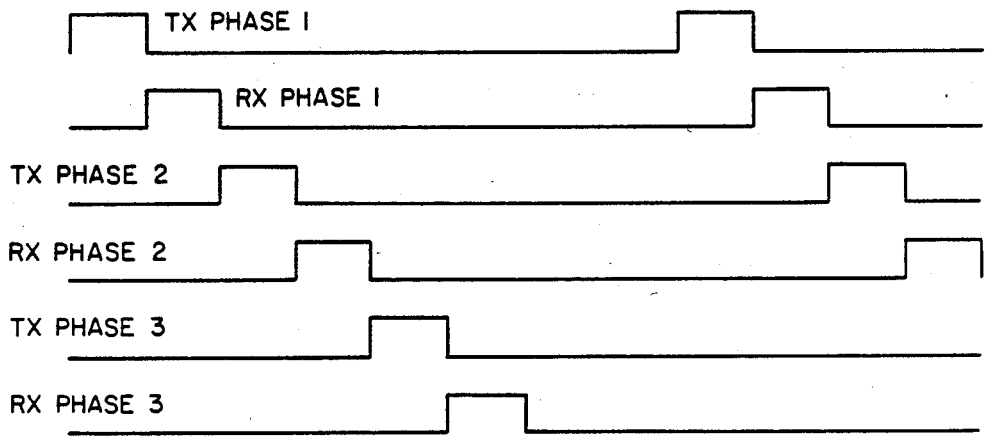
MPU R/W TIMING: (A SINGLE READ OR WRITE PER PHASE)
SEQUENCER TIMING DIAGRAM
*FIG_9*

SYMBOL CLOCK TIMES:
UNIQUE WORD DETECT PULSE:
APERATURE FORCED IN NOMINAL POSITION BY REF. UNIQUE WORD DETECTION:
DETECTION APERATURE
RECEIVE CONTROL WORDS (NOMINAL SETTING)
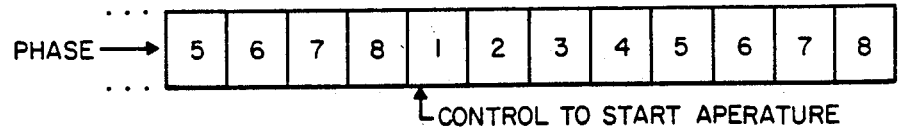
RECEIVE SIDE SYNCHRONIZATION PROCESSING
FIG_10

SYMBOL CLOCK TIMES:

TRANSMIT LOOPBACK UNIQUE WORD DETECTION PULSE:

CASE I, TRANSMIT TIMING IN NOMINAL POSITION:

LOOPBACK DETECTION APERATURE

RECEIVE CONTROL WORDS (NOMINAL SETTING):

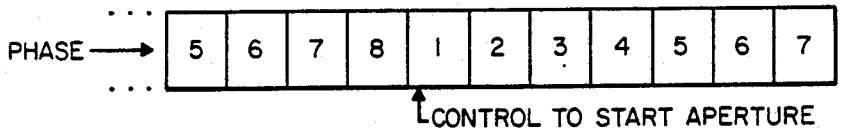

↳ CONTROL TO START APERTURE

TRANSMIT START TIME CONTROL WORD (NOMINAL SETTING):

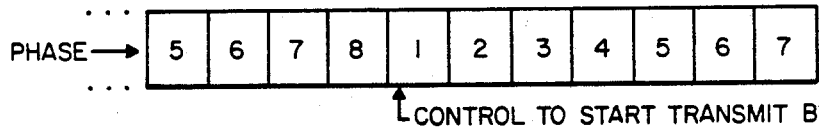

↳ CONTROL TO START TRANSMIT BURST

TRANSMIT START TIME CONTROL WORD (ADVANCE START TIME):

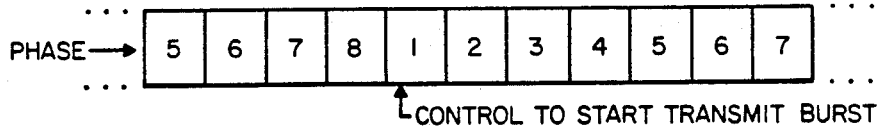

↳ CONTROL TO START TRANSMIT BURST

TRANSMIT START TIME CONTROL WORD (RETARD START TIME):

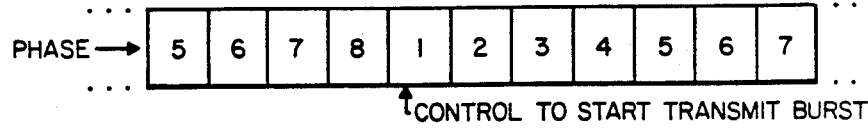

↑ CONTROL TO START TRANSMIT BURST

TRANSMIT TIMING SYNCHRONIZATION PROCESS

*FIG_11*

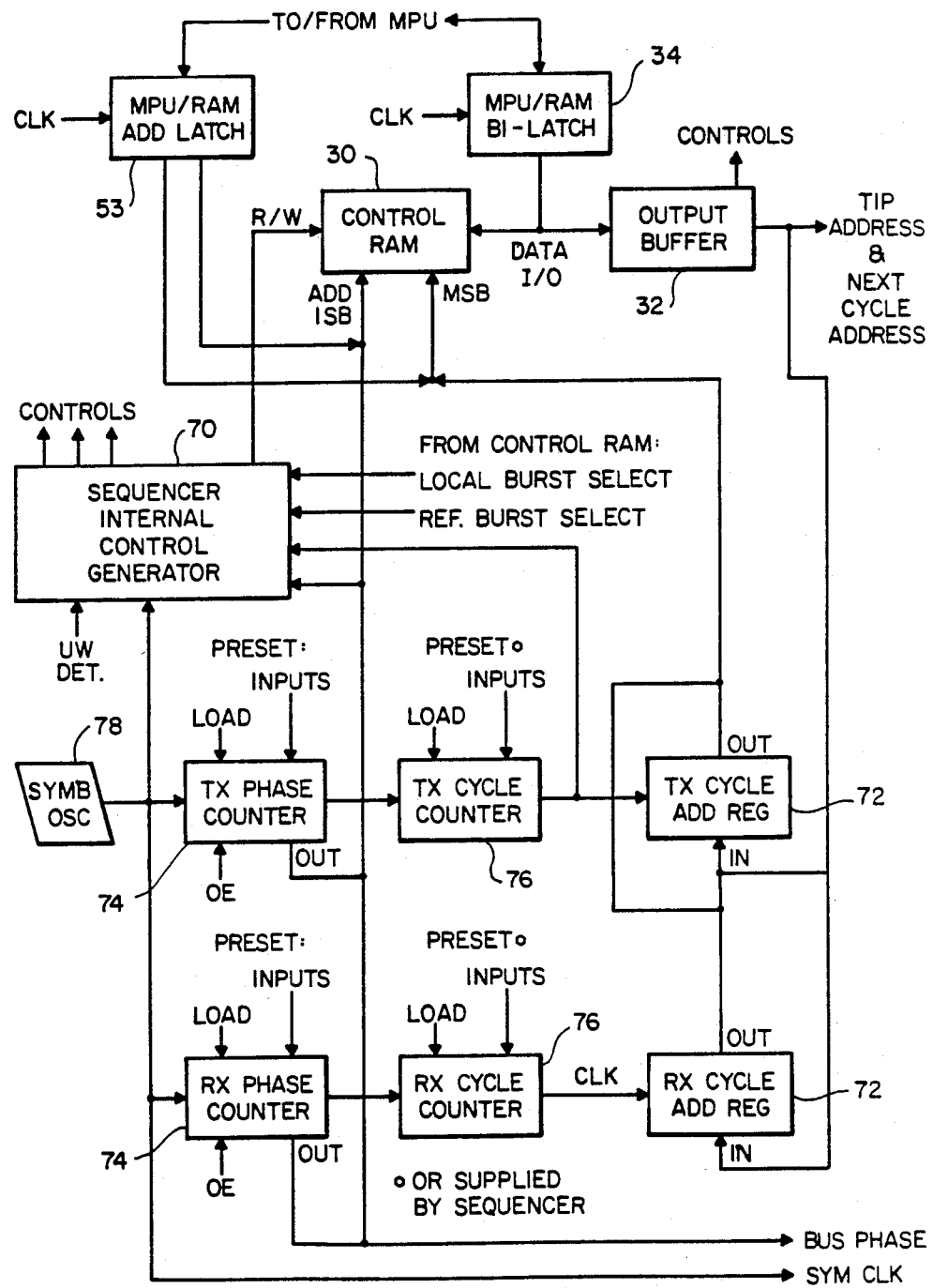
VARIATION ON THE SEQUENCER DESIGN
FIG_12

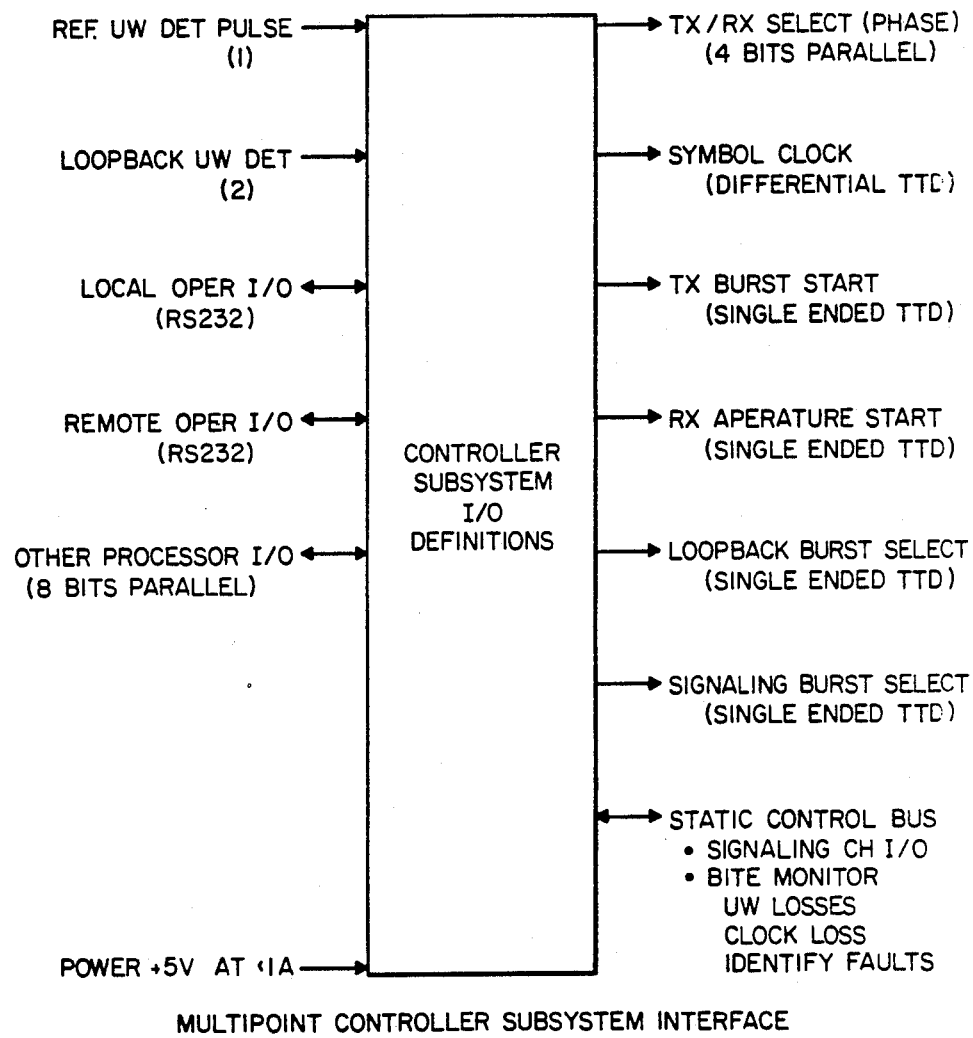
MULTIPOINT CONTROLLER SUBSYSTEM INTERFACE
FIG_14

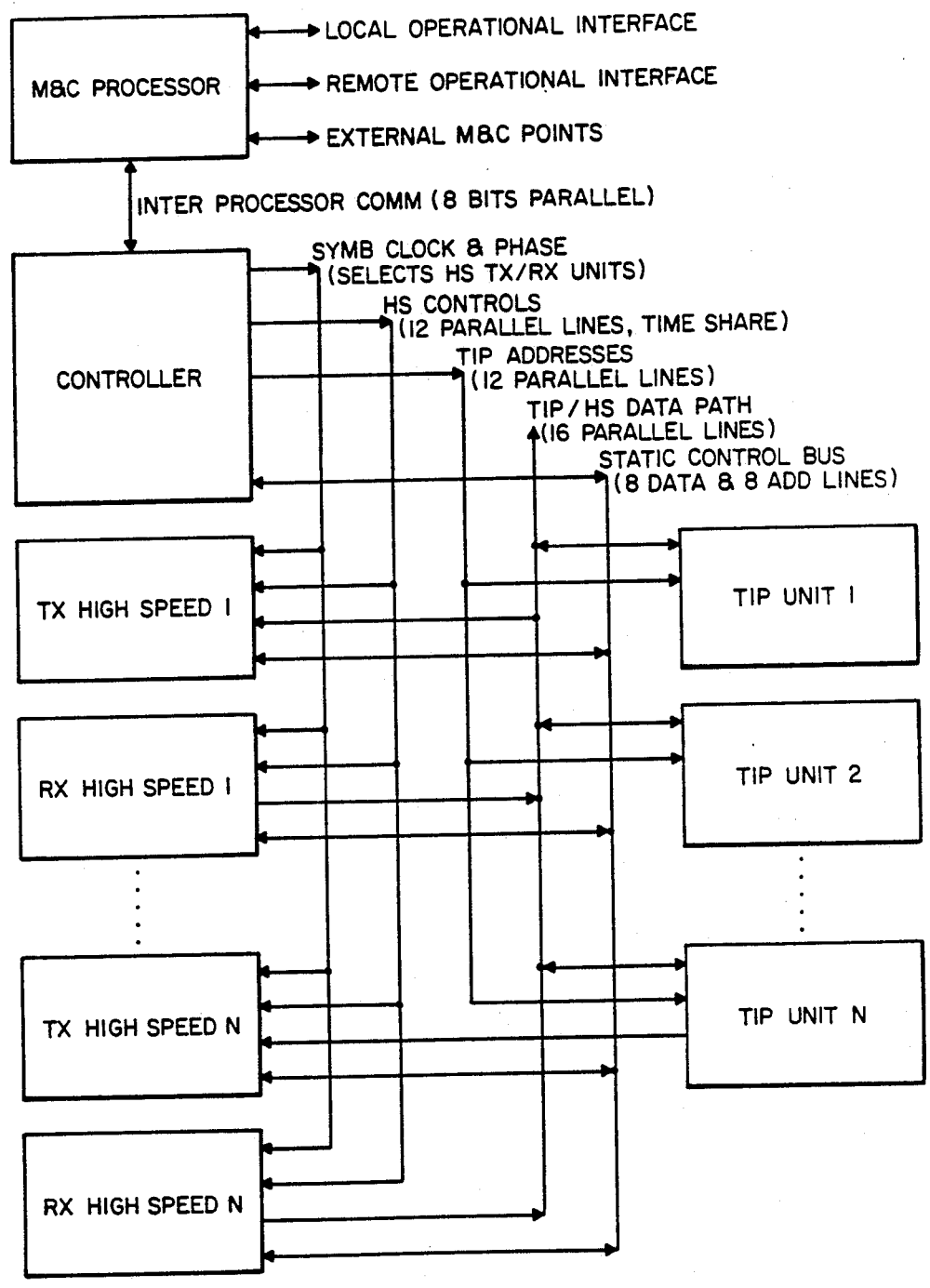
MULTIPOINT CONTROLLER BUS ARCHITECTURE
FIG_15

TDMA TERMINAL CONTROLLER

This is a continuation of application Ser. No. 073,847 filed July 13, 1987, which is a continuation of application Ser. No. 805,616 filed Dec. 6, 1985, both abandoned.

The present invention provides the architecture for a multi-carrier time division multiple access (TDMA) terminal for use in a satellite communication system. The architecture enables a single terminal to simultaneously operate with multiple TDMA modulators, demodulators (modems) and terrestrial interface ports (TIP), all using a common interface. This provides a terminal which can accommodate a wide range of traffic requirements, and simultaneously operate with both single channel per carrier (SCPC) and TDMA carriers. The system operates by allowing for a plurality of stations which are transmitting in bursts, each burst being assigned a specific time frequency slot within a complete transmission frame. Different time frequency slots are allocated for transmission from each station. A sequencing system and method is provided so that the signal transmissions are always properly synchronized between the transmitting and receiving stations. The present invention is directed to satellite communication systems and more particularly to a TDMA (time division multiple access) terminal capable of simultaneously supporting multiple modulators, demodulators, and terrestrial interface ports with a common interface.

The TDMA method of satellite communication is an accepted practice. The International Telecommunications Satellite Corporation (Intelsat) has accepted TDMA as a standard for operating in the Intelsat system.

In TDMA transmission, the satellite transponder is used or accessed by a number of earth stations in an ordered time sequence. The transmissions are timed such that the quatrature-phase shift keyed (QPSK) modulated RF carriers on the same frequency arrive at the satellite without overlap. The primary advantages of the TDMA method for commercial satellite communications are efficient utilization of satellite power and frequency spectrum, and flexibility in reconfiguring the TDMA burst and traffic patterns.

In general, a TDMA terminal must perform two basic functions. First, the terminal must form a burst from a continuous stream of data, and transmit this data with a preamble at a specified time on a specified carrier frequency such that the transmitter burst does not interfere with any other burst transmissions, since all transmissions are being directed through a common satellite. Second, the terminal must receive burst transmissions intended for the terminal, recover the continuous data streams from the received bursts and route the data to the correct terrestrial interface port (TIP).

Accordingly, as it has been done in the prior art in conventional TDMA systems, the terminal addresses the data to ports, receives the corresponding data from the addressed ports and assembles the data for TDMA transmission in a burst format. To accommodate burst data transmission, the data is preceded by preamble overhead. The preamble of each burst contains carrier and bit timing acquisition signals, origin code information, monitor and control data and the like. The burst is then modulated onto a carrier for transmission.

In the receive mode of operation, the modulated bursts are received from the modem and essentially the reverse of the above processing is accomplished so that continuous data and write address signals can be sent to the proper TIPs.

As described above, modulated carriers of the same frequency must arrive at the satellite transponder without overlap. Accordingly, participating stations in TDMA system are allocated certain burst positions within a TDMA frame, and each station must time its transmissions so that its burst will arrive at the satellite during the proper interval in the TDMA frame. Further, a source of common frame reference timing is required, and each station synchronizes its burst transmission to this common frame reference timing based on satellite range formation.

In TDMA systems designed to date, i.e., prior to the present invention, only one carrier at a time is transmitted and received by an individual terminal. Multiple bursts may be transmitted and received at different times; however, they must occur separately without overlap. See for example U.S. Pat. No. 4,355,388, Microprogrammable TDMA Terminal Controller, issued Oct. 19, 1982, incorporated herein by reference. This patent explains in detail much of the terminology which will be used in describing the present invention and the description in that patent is hereby incorporated by reference.

More recently, Comsat has developed a TDMA terminal different from that described in the above patent. This terminal, again only operates with a single carrier (see R. Ridings, et al. "verification tests of a prototype Intelsat TDMA/DSI terminal" Proceedings of the Sixth Digital Satellite Communication Conference, 1983, pages 11-14.

A number of other manufacturers of modern TDMA equipment have similarly developed and tested high performance systems. See for example Takuro Maratani, et al., "Satellite Field Tests of TDMA/DSI Terminals" Proceedings of Sixth Digital Satellite Conference, 1983, page II-1). However, the manufacturers reported in these proceedings have also produced TDMA terminals capable of operating only with individual single TDMA carriers.

This limitation to operating with only a single carrier is dictated by the standard TDMA terminal architecture. In all TDMA terminals known to the present inventor, only a single TDMA modem is provided. This presents a serious system limitation to networks using TDMA equipment. With the single modem approach, all stations must be installed with the same burst bit rate, effectively determining the station's and network's capacity limit.

It is an objective of the present invention to provide a TDMA terminal which is capable of supporting a plurality of modems. More particularly, it is an objective of the present invention to provide a TDMA terminal which has a plurality of modems fully interconnected over a common bus structure to the terrestrial interface ports.

It is a further objective of the present invention to provide a controller which allows each individual TDMA terminal to operate with multiple simultaneously operating TDMA modems. In this arrangement, stations can be equipped as required with the number of modems necessary to match the actual traffic demand for that terminal. In this way a broad mix of station traffic requirements can be efficiently accommodated using this very flexible approach.

More particularly, it is an objective of the present invention to provide a system which is capable of dynamically reconfiguring its operation to modify the number of modems and ports being supported.

Another objective of the present invention is to provide all the necessary control signals necessary for operating with multiple carriers via a single common sequencer based controller and internal bus.

Another objective of this invention is to provide a terminal capable of operating with one modulator and multiple demodulators, or one demodulator and multiple modulators, or combinations thereof.

Yet another objective of the present invention is to provide a terminal which supports the on-line dynamic reconfiguration of TDMA network traffic. This allows the network to optimize use of satellite capacity since only active channels are transmitted. More specifically, a partially empty frame within a complete transmission frame may be dynamically reconfigured to add the space for additional sub-bursts of traffic depending on the number of ports communicating through the controller at any given time.

Yet another more specific objective of the present invention is to provide a microprocessor controlled programmable sequencer which may dynamically reconfigure its operation utilizing linked lists of addresses, whereby the reconfiguration of the traffic is achieved by modification of the sequence of addresses read out of the control ram field.

As noted above, a key issue in supporting TDMA traffic is traffic synchronization. This is an important issue as the satellite is constantly moving, and therefore the distance over which the traffic must travel and consequently the delay between transmission and reception is constantly being modified. Therefore, it is an objective of the present invention to provide a receiving system in which the synchronization of the system with the received data is constantly being dynamically updated so that the receipt of data is synchronized with the operation of the received ports.

Another important objective of the present invention is to provide a terminal with robust synchronization techniques which allows the operation of the terminal in satellite networks with high fadings such as occurs at the KU frequency band. Such operation requires continuous updating of the synchronization process to force the aperture into the nominal position relative to the detected unique word which is a part of the normal satellite transmission sequence.

Another objective of the present invention is to provide a terminal which supports a number of different methods of burst transmission synchronization. This allows the terminal to operate in future satellite systems utilizing spot beams. This multiple modem feature may be especially useful in spot beam transmission, where the transmitting station cannot always receive reference frame data which is used for synchronization. In such a system, a second station may receive the reference burst and retransmit or retransfer the reference.

The above and other objectives of the present invention are accomplished in a TDMA terminal which comprises a plurality of terrestrial interface ports, a plurality of modems for modulating preamble and port data onto a carrier and demodulating the received data transmitted via a satellite from the carrier wherein the interface ports and modems are fully connected over a common bus arrangement and the TDMA terminal controller further incorporating the common bus structure interconnecting the modems and ports, and a controller incorporating means for controlling the sequence of transmission (TX) and reception (RX) of information through these multiple ports and modems. More particularly, the control comprises sequencing means for selectively activating the ports and modems to accommodate current traffic requirements. This is achieved by presenting clock timing signals and port address signals repetitively to the ports during each transmission frame to couple the ports to the bus for transmit and receive information during the allocated burst intervals. Means are incorporated within this sequencing system for adding or deleting bursts, for selectively defining the ports and modems to be coupled to the bus. Further, means are provided for adding or deleting clock intervals ("phases") to the addressing sequence to modify the timing of the transmission frame. Means are further provided for adding or deleting these phases in order to center the frame with the transmission and receive aperture, in order that terminal the remains fully synchronized with the transmission of information.

The present invention will be more clearly understood by reference to the following description in conjunction with the accompanying drawings in which:

FIG. 1 depicts data flow in typical TDMA operations;

FIG. 2 illustrates the typical structure of a TDMA burst and the sub-bursts which are transmitted to and from individual ports in the TDMA controller.

FIG. 3 illustrates conventional TDMA terminal architecture comprising a plurality of ports controlled by a controller to communicate over a bus with a single TDMA modem;

FIG. 4 illustrates the TDMA terminal architecture in the present invention in which a plurality of ports communicate with a plurality of modems over a single bus under the control of the present terminal controller;

FIG. 5 is a block diagram of the TDMA controller of FIG. 4;

FIG. 6 is a simplified flow chart of the software utilized in the present invention, especially the synchronization of the present invention;

FIG. 7 illustrates the microcontrol word field assignments utilized in the controlling microprocessor of the present invention;

FIG. 8 illustrates the control ram link list sequence which is utilized to provide the control of the sub-bursts in the burst structure in the multiple model terminal of the present invention;

FIG. 9 is a timing diagram of the sequencer utilized in the present invention;

FIG. 10 illustrates the receive side and FIG. 11 the transmit side synchronization processing accomplished by the sequencer of the present invention;

FIG. 12 is a variation of the sequencer design of the present controller shown in FIG. 5;

FIG. 13 illustrates a variation on the sequencer list of the present invention;

FIG. 14 is a bock diagram illustrating the interface signals provided by the controller subsystem by an alternative embodiment of the subsystem and FIG. 15 illustrates the bus architecture utilized to convey signals between the multiple modems and the multiple TIP by the processor of the present invention.

In TDMA operation, multiple earth stations access particular satellite bursts of RF energy in an ordered time sequence. Each station, which in this embodiment will be a complete TDMA terminal, transmits and receives data as bursts of modulated RF energy or carriers. Conventional TDMA terminals are equipped with a single, on-line TDMA modem to support a single burst carrier. In such systems, it should be noted that an additional TDMA modem may in fact be associated with a terminal to provide redundancy.

The stations in a TDMA network synchronize their transmissions such that the signals within a TDMA frame period all arrive at the satellite in order without overlap. Thus, the transmission from station one arrives as traffic burst T1; the transmission from station two as traffic burst T2, and so on. As shown in FIG. 1, any one station may act as a reference station transmitting the reference burst R. All earth stations receive this burst indicating the signals comprising the reference frame as well as all traffic bursts T1-TN. The reference frame transmitted periodically by the reference station signals the beginning of each TDMA frame period. In the arrangement shown in FIG. 1, all stations can receive all down link bursts from the satellite, and can measure the position of their own burst T1, T2, TN with respect to the reference burst R in the receive frame, i.e., its position in the total TDMA frame period.

Obviously, it is essential to synchronize each station with the frame so that the station may understand the position of the traffic it is to receive within the frame. A common form of TDMA synchronization is loop back synchronization, described in O. G. Gabberd, "Design of a Satellite TDMA Burst Synchronization," IEEE Transactions of Communications Technology, Vol. COM-16, No. 4, August 1968, pages 589-596, incorporated herein by reference, as well as the above incorporated Deal patent. In this loop back synchronization method, stations individually measure the position of their own burst T1-TN and adjust its position to keep it centered in the assigned time slot within the total TDMA frame period. It is important to note further that the actual burst transmission times of the stations depend on the propagation delay of the path from the station to the satellite. This delay is a function of the station and satellite locations, and is unique for each station. Consequently, each station must maintain its own unique record of the transmit time frame and its position for transmission and receipt relative to the reference burst R in this time frame, and periodically update this timing in order to track the satellite motion. This process is similar for both conventional terminals and the TDMA terminal of the present invention. However, the present terminal has the added responsibility of performing this task for multiple TDMA carriers, all of which will be transmitted in sub-bursts contained within the burst data of the station's time slot within the complete TDMA frame period. Before considering the design of the TDMA terminal itself, it is instructive to establish the structure of the TDMA burst. This structure is the same for conventional TDMA terminals as well as the present invention, the difference being the ability to contain significantly more data from a larger number of channels within the burst data sequence. The format of a typical TDMA burst is shown in FIG. 2. The two major parts of the burst are the preamble and the data sections. In this arrangement, the burst preamble contains the housekeeping or overhead information for terminal and network operations. It is a part of every burst in the complete TDMA frame period.

In this arrangement which is a standard arrangement, the burst preamble contains the housekeeping or overhead information which is necessary for terminal and network operation, especially to identify the addressed port and to provide the necessary synchronization between transmit and receive terminal sides. The data section of the burst is divided into sub-bursts associated with individual ports. The functions of the various elements of the bursts are described as follows:

Synchronization sequence This sequence must appear at the beginning of each burst (it should be remembered that a complete TDMA frame, looking at it from the prospective of the receiving satellite, comprises a reference burst, and a sequence of traffic bursts. What we are now considering is the format contained in a single one of the bursts T1-TN. This synchronization sequence is necessary to establish the reference carrier and clock timing necessary for recovering received data.

Unique word The unique word is a special sequence of bits which have good detection properties, i.e., the bits are chosen because they can be detected at the receiving station in a sequence which has a high probability of accurate detection. The unique word is explained fully in the incorporated Deal patent, is a time mark or special synchronization word which is especially used to keep the receive side aligned. It resets the decoder in the controller of the receive side and, in the present invention where transmissions are conveyed to a plurality of ports in a single terminal in a single burst, can be used to allow the controller to slip the transmit (TX) and receive (RX) phase signal sequences to keep accurate synchronization. More specifically, the detection of this word by the TDMA demodulator (FIG. 4) indicates the end of the synchronization sequence, and the beginning of detection of the burst information.

Station identification code (IDC) This sequence of bits uniquely identifies the TDMA station. This information is necessary for network management, for as shown in FIG. 1, all stations receive all bursts, but a station will wish to decode only its own traffic burst.

Optional signaling channel This is an optional portion of the burst used for network control and maintenance. Typically, the signalling channel is used to control network interconnections and to pass alarm and maintenance messages. That is the reason for its variable length.

Voice order wire This is also optional portion of the traffic burst. The voice order wire is also a known signalling sequence used in network management.

Burst data As shown in FIG. 2, the burst data is transmitted to comprise sub-bursts or subpackets of information. Each of these subpackets is uniquely identified with related or directed to specific transmit and receive ports in the network.

In carrying out the operations necessary for a TDMA satellite communication, the TDMA terminal performs a number of basic operations. These operations are performed by conventional TDMA terminals, using circuitry represented in the block diagram of FIG. 3.

Conventional TDMA terminals consist of the following major building block circuitry, all of which is conventional in the art: ports IN which are multiple modular units;

a port interface bus 10 for passing timing data and control signals between the controller, the modulators and the ports;

a single TDMA modulator 12; a single TDMA demodulator 14; and a TDMA terminal controller 16.

In contrast, the TDMA terminal of the present invention is functionally represented by the circuitry shown in FIG. 4. The distinction to be noted is that the terminal of the present invention supports multiple TDMA modulators and demodulators fully connected to the common set of interface ports over a control data bus 20 shown in detail in FIG. 15. It is especially significant in the present invention. Multiple modems 1-N are incorporated into the fundamental design of the terminal controller 22 as described in detail below. A basic understanding of the difference between the present invention and prior art can be gained from the following comparison of the operation of a conventional terminal and the TDMA terminal of this invention.

Considering the block digrams of the old and new TDMA terminals represented in FIG. 3 and 4, in both cases, data enters and exists the terminals via the terrestrial interface ports TIP 1-N. Also, in both designs, these TIPs are modular, and can be expanded to accommodate traffic requirements up to the capacity limit set which is defined by the TDMA modems. In the conventional design, this limit is a single TDMA modem capacity limit. Clearly, the use in the terminal of the present invention of multiple modems 1-N allows expansion of the capacity of the terminal up to the multiple modem capacity.

In both designs, the ports contain interface and memory circuitry which form blocks of data for the burst operation comprising bursts formation of a burst TN as shown in the communication example of FIG. 1. Terrestrial data or traffic enters and exists these ports (TIP) in continuous bit streams. The data is buffered by the ports; i.e., compressed (TX) or expanded (RX) to convert continuous terrestrial source/sink data into TDMA burst data. Appropriate preamble information is added in the modem.

In the conventional terminal, individual ports are sequenced on and off for transmission and reception of burst data by the single TDMA modem. In the terminal of the present invention, multiple ports are sequenced on and off, and the data to be formed into bursts is routed to multiple TDMA modems via the single bus in a fully interconnected arrangement as can be seen in the bus architecture drawing of FIG. 15. It is a common arrangement for the ports to be connected to the internal subsystems via an internal bus arrangement. This is shown in both FIGS. 3 and 4, where the bus handles both the data and controls necessary for operation. In FIGS. 3 and 4, port data is connected to the TDMA modulators and demodulators via the bus. Ports are selected or addressed for burst transmission and reception by the controller also via bus circuitry. As noted above, in the case of the terminal of the present invention, the bus provides the routing for multiple data paths and controls as shown in detail in FIG. 15.

The function of the TDMA modulator 12, 14 (FIG. 4) is to form the burst preamble shown in FIG. 2 and modulate the preamble and the burst data on a carrier for transmission. Typically, the carrier is at a 70 MHz IF and the modulation is quadrature phase shift keying (QPSK). The preamble information is of two types.

Fixed patterns such as the synchronization sequence and station IDC are generally stored in programmable read only memory (PROM) located internal to the modulator. Variable data, such as associated with the signalling channel and order wire are generally supplied to the modulator by the controller 22. The controller 22 also properly sequences or gates the flow of preamble and port burst data to the TDMA modulator 12. The TDMA demodulator 14 performs the inverse operation. The demodulator 14 decodes the received carrier, detects the unique word UW and routes the decoded data (properly timed) to the bus and the ports. The TDMA demodulator 14 also demultiplexes the preamble data and routes the variable portions of the preamble to the appropriate interfaces coupled to the terminal. Again, as with the modulator 12, the timing of all demodulator events requires appropriate gating of data paths by the controller 22. Even though the fundamental TDMA modulation and demodulation operations of the conventional and multipoint TDMA terminals are the same, the controller designs and bus architectures are different as will be discussed in the next sections, these differences provide the terminal controller of the present invention, its ability to carry out the control of multiple modems and data ports.

The terminal controller of the present is designed to support multiple TDMA carrier operation. It controls the multiplexing and demultiplexing of data between the terrestrial ports and multiple TDMA modulators 12 and demodulators 14. It also controls the interface circuitry to support the signal channel operation based on information developed internally in the controller and supplied to the modulator. To achieve these functions, the terminal controller provides the receive and transmit timing synchronization which is necessary to achieve these interleaved operations.

The block diagram of the controller of the present invention is shown in FIG. 5. The basic elements comprise a sequencer subsystem which includes the control store RAM 30 its associated buffers and output drivers and latches including output buffer 32, MPU bidirectional latch 34, and the transmit TX next address latch 36 and receive RX next address latch 38. Data in the control RAM is accessed and utilized by the microprocessor unit 40 which includes a self-contained microprocessor subsystem to be described below. In addition, an MPU/sequencer interface for providing priority interrupts 42 is coupled to the microprocessor. Also, a simple timing oscillator and phase decoder including counter decoder 44 is provided responsive to the unique word UW to control the timing of the transmit and receive sequence as described below. The operation normally alternates between transmit and receive operations as defined by control words taken from RAM 30, the addresses being sequentially supplied by transmit and receive latches 36, 38.

The microprocessor subsystem of the controller appears in FIG. 5. The microprocessor subsystem 40 has its own peripheral circuitry and internal bus arrangement shown at the bottom of FIG. 5 including both RAM and ROM 42, electrically erasable ROM 44, and serial and parallel IO 46, 48, communicating over a bus 50. More specifically, the microprocessor is a Motorola 68000 16-bit circuit. The internal MPU bus 50 is tailored for operation with this microprocessor and in the case of the 68000 microprocessor supports a 16-bit parallel data path with a 2A-bit peripheral and memory address space. The RAM 42 and ROM 43 provide the internal operating memory of the microprocessor. RAM 42 provides the temporary storage for system parameters and variables, and the ROM 43 contains the operating system necessary to support the operational routines. The priority interrupt resolver 41 is provided because the transmit and receive frame timing is critical to the TDMA network synchronization. (The signals shown here are taken from the receive board and are typically available in systems of the present type and in the systems whose descriptions are incorporated by reference.)

Interrupts which mark the occurrence of these events allow the terminal to properly coordinate the transmit and receive signals. It is for this reason that the counter decoder 44 which is responsive to the unique word detector is tied to the microprocessor bus, as this unit is especially used in modifying the transmit and receive sequence. Specifically by responding to the unique word UW it can indicate to the microprocessor that a transmit burst or receive burst is occurring—an important piece of information in making timing corrections as explained below. This counter 44 also counts out the phases for transmit and receive. The operations are otherwise run off the timing of oscillator 45 without microprocessor intervention. The resolver handles the timing interrupts and other interrupts on a priority basis. The EEDROM 44 retains parameters to allow the terminal to reenter the TDMA network in the event of a failure. The serial interface 46 is provided to interface with an external processor or telephone modem if desired. The parallel interface 48 allows the microprocessor to carry out a dialogue with both internal and external subsystems associated with the terminal. A simplified flow chart illustrating the operation of the microprocessor software is presented in FIG. 6.

The microprocessor 40 performs the terminal self-test an initialization processing necessary for start-up. These are all in conformance with standards well established in the industry as indicated in the referenced articles. In addition, the microprocessor performs the necessary tasks for acquisition and steady state TDMA synchronization. Another major element of the processing is terminal traffic management and maintenance. This includes operation of the signalling channel and processing associated with network reconfiguration and alarm reporting. A local or remote operational interface to the terminal is also provided by a microprocessor service routines and a CRT/keyboard interface.

As noted above, many of the tasks performed by the controller are based on well developed technology in the satellite communication industry. The areas which had to be specifically developed to implement the present invention are the sequencer and associated bus architecture in the terminal. In the present design, a single common RAM based sequencer performs all of the control necessary for operation of multiple TDMA modulators and demodulators, communicating through multiple ports. Two variations of the sequencer design are presented in the following material. The first variation includes those elements which are shown in FIG. 5. The RAM based sequencer shown in this figure operates at the TDMA terminal clock (symbol) rate. The sequencer steps through a predetermined set of RAM addresses, one per clock period. In this process, a separate or distinct output microcontrol word is provided by the sequencer for each separate clock. These words are taken from the control RAM 30 under control of the microprocessor 40 through the MPU/RAM handshake 52. They are conveyed through the output buffer 32 onto the bus as shown at the upper right of FIG. 5. The sequencer microcontrol word format or structure is shown in FIG. 7. It is these words which are withdrawn one at a time from the control RAM and transferred through the output buffer to provide necessary control signals out over the bus to the ports. The fields of the microcontrol word as indicated are the next address, port address, and controls. Considering for the moment the last two of these fields, the function of the port address is to select a transmit (TX) or receive (RX) port for burst data transmission or reception. The controls are provided as outputs simultaneously with the port address and cause various events to occur. The controls comprise for example the forward error correction (FEC) on/off control to provide on-line operation of an optional FEC processor described in the application of John Gates entitled Forward Error Correction System, attorney's docket number A-42497 incorporated herein by reference. The hopping controls also shown in FIG. 7 are used to select the carrier frequency and/or transponder for the burst. The third major element of the sequencer microcontrol word is the next address field. This field allows the sequencer to operate as a linked list, by recirculation of this next address through the transmit and receive address latches 36, 38 back through the control RAM 30 on the address bus.

In link list operation, as shown in FIG. 8, the sequencer steps through the microcontrol store memory location in an arbitrary order, with the next location in RAM to be address defined by the next addressed portion of any word field. FIG. 8 illustrates the basic nature of link list operation. The sequence beginning at location 02 steps to location 04; location 04 steps in turn to location 25 and 25 to 26. Location 04 steps in turn to location 25 and 25 to 26. At this point, location 26 is next addressed points location 02 which begins the process anew. As indicated in this example, the link list approach to the sequencer control memory design has several advantages. For one, this approach allows the microcontrol words to be programmed into the microcontrol store in any arbitrary order. This is important for basic memory housekeeping reasons. In the link list approach, microcontrol memory space can be assigned in any order without regard to the actual timing of occurrence of the microcontrol word. The link list approach is also very important for the microcontrol store rewrite operations as occur when network traffic is reconfigured. With a link list, it is a simple matter to add or delete sub-bursts (refer FIG. 2, which shows data sub-bursts from the various ports as making up the variable length of burst data of any complete frame from a terminal) by simply adding or deleting a link in the control chain. This is contrasted with a control store organization which is position (microcontrol RAM address) dependent. In a position dependent arrangement, a change at the beginning of the control sequence forces a rewrite of the entire sequence. This is a time consuming task and could prevent or severely limit the ability of the terminal to function with dynamic reconfiguration. As previously explained, the single common sequencer and associated bus actually control multiple TDMA modems 12, 14 and ports 1–N. The way this is accomplished is apparent from a study of the following sequence timing diagram. FIG. 9 shows an example of a typical sequencer timing arrangement. In this example, the sequencer supports three separate TDMA modulators 12, i.e., transmit (TX) and three separate TDMA demodulators, i.e, receive (RX) units 14. This is accomplished through multiphase clocking.

The counter decoder 44, previously shown in the right hand center of FIG. 5, is responsive to oscillator 45 to generate the appropriate clock phases which are output on the HS phase line of the common bus 10. These phase signals along with the bus clock itself which is the direct output of the oscillator 45 are presented to the bus for interconnection to the other terminal subsystem, i.e., modems and ports.

In this arrangement, one particular TDMA modulator 12 or demodulator 14 only responds to a specific phase. Note in the timing diagram that TX1 and RX1 respond to phase 1. Thus the bus timing by the combination of counter decoders 44 and oscillator 45 provide a selection for TX and RX phases of particular modulators or demodulators.

Note that the transmit side TX and the receive side RX associated with phase 1 respond to bus clock periods 1 and 2 respectively. This is in keeping with the concept of a single common controller for both TDMA transmit and receive operations.

Further, the process is periodic with specific TX and RX units being selected every bus cycle. In the example shown in FIG. 9, a bus cycle is 8 bus clock periods. Also, as indicated in the port addressing time sequence shown in FIG. 9, the ports are addressable for all phases. In the example shown, Ch 3 is assigned to TX1 and Ch 7 is assigned to RX1. In this way, each TDMA modulator and demodulator is fully interconnected to all ports.

A slight variation in this regime occurs during bus clock periods 7 and 8. As indicated, for these periods no TX or RX units are selected; instead, for these periods, no addresses are presented to the ports. This effectively disables bus access to the ports and the TX/RX (modulator demodulator) units. This disabling allows the two full clock periods out of every eight to be used for microcontrol RAM housekeeping functions. During these periods, the microprocessor 40 can access the microcontrol RAM itself and alter its contents. Among the tasks performed during this housekeeping period are microcontrol word updates and sequencer timing adjustments. The sequencer timing adjustment or microcontrol word updates are necessary to change the control sequence, i.e., add or delete links. That is, by changing the links, sub-bursts can be added or deleted from the burst of information of a complete frame as illustrated in FIG. 2, or the terminal traffic can be reconfigured in the sense that different channel assignments can be related to different modems.

Timing adjustments are inherent to TDMA operation because of the movement of the satellite relative to the earth. These adjustments are necessary in order for the sequencer to maintain synchronization in the TDMA network. When used for timing adjustment, the null periods can either be deleted or repeated to effectively shift the actual (real) time occurrence of a sequence of TIP addresses. This in turn shifts (retards or advances) the actual time of occurrence of the TDMA burst transmissions. Consider for the moment with reference to FIG. 10 which illustrates the nature of the receive side synchronization process. By this synchronization process, the sequencer of the invention maintains independently both the receive and transmit TDMA burst timing. It is this timing that is responsive to the detection of the unique word which is illustrated as being a part of every received burst transmission in the preamble portion. The counter decoder is responsive to the unique word detection pulse which is presented via the bus to the timing circuits of the counter decoder within the sequencer. This pulse, as indicated in FIG. 5, resets the phase generator to a predetermined state causing in the appropriate place the addition where necessary or deletion of additional null addresses. In FIG. 10, the occurrence of the reference unique word detecting pulse causes the sequencer phasing to be normalized. This in turn causes the receive side timing to be normalized with the unique word detection aperture centered with respect to the occurrence of the unique word.

FIG. 11 illustrates the transmit side synchronization process. This relies on for example a loop back synchronization process. The objective of this process is to keep the unique word detection pulse of the terminal's own burst centered in its proper aperture. The position of the loop back unique detection pulse and the aperture are shown at the top of FIG. 11. If the pulse is centered, as shown in the figure, no correction is required. If, however, the pulse slip caused as a result of transmission delays or relative movement of the satellite, by a bus phase increment to the right (early), or the left (late) of the aperture, a transmit burst timing correction is carried out.

The unique word detector 44 is used to maintain synchronization of the system. The width of the frame is defined so that the unique word always falls within the aperture. Nominal early and late positions of the sequencer transmit timing are also illustrated. The nominal, early and late positions of the sequencer transmit timing are illustrated in he bottom half of FIG. 11. In making timing correction, as previously indicated, the sequencer transmit cycling is slipped with respect to the receive side timing by the addition or deletion of clock phases to the timing sequence.

The two sequences are essentially independent lists and can be slipped with respect to one another. (One full iteration through a list and back to the starting point determines the frame.) The slipping is carried out by the MPU 40 by deleting or adding clock phases to the transmit side without altering the receive side list. It does this when upon receipt of the unique word (UW) as indicated by decoder 44, it finds the unique word is occurring before or after it is supposed to in the frame.

This slipping is carried out during transmit side idle control time. Corrections are made on the transmit side so that there is no interference with the continuity of control signal transmissions. A burst has a defined organization; (FIG. 2) but the corrections are random because they are related typically to satellite motion. Therefore, the two limitations on corrections are: no corrections during transmit side burst, or that interfere with the receive side operation. The linked list busy time "burst on," (FIG. 7) tells the system when not to correct. When transmit burst ends, you have a guard time, FIG. 9, (or a reference burst time) when you can make a correction. Since the sequencer has accessed the microcontrol RAM, a transmit timing slip can be introduced by altering the transmit side link list directly. This can be accomplished through the MPU address latch 53 and the handshake 52. Additional null operations are inserted or an already existing null operation is deleted from the list to make this timing modification. The number of null addresses that are introduced and the length of time they are allowed to exist within the list determines the extent of the correction. A variation of the design is available which reduces the sequencer memory requirement. In TDMA operation, ports and modems are selected for specific durations. This duration typically corresponds to a specific unit of capacity, or perhaps multiple units of capacity. For example, a 64 KBPS, PCM encoded voice channel represents a standard in the industry. For terminals handling voice traffic, it is quite natural to select ports and modems in equivalent 64 KBPS channel increments. In this example, considering a TDMA frame period of 20 milliseconds, the effective unit of capacity is 64 KBPS times 20 milliseconds, or 1,280 bits. This is much longer than the timing resolution available in the first design (two bits). The basic sequencer design described above requires a microcontrol word be processed by the sequencer every sequencer clock period. This results in a high demand for microcontrol memory.

In the above example, this works out to 1,280 bits per channel over two bits per memory location equalling 640 memory locations for one channel alone. The answer to this problem is to compress the actual microcontrol memory space required such that only one microcontrol word is required to handle one basic unit of capacity. The method accomplished this is described in the remainder of this section. FIG. 12 shows in detail a portion of the sequencer which is modified in this variation of the design.

In this alternative embodiment, the sequencer 70 steps from instruction to instruction. It does this simply to allow a short list of instructions (FIG. 13), equal to a single unit of capacity, to be constantly reiterated n times. The sequencer 70 enters the list of instructions of FIG. 13, and follows the list using the TX cycle address latch 72 to call the proper instructions from RAM 30. The phase and number of cycles executed since the cycles are to be repetitive) are counted by phase counter 74 and cycle counter 76 in response to system oscillator 78.

Equivalent elements are shown for the receive side, i.e., phase counter 74, cycle counter 76 and cycle address register 78 to execute an equivalent set of instructions for receive side operation.

Separate sets of operating elements must be provided bcause the transmit and receive side operations can be slipped relative to one another, as explained above.

Referring to FIG. 15, the major control signals carried on the control bus are shown. Phase controls select a given module for the transmit or receive function at any given time. The modules only respond to the control signals during their selected phase. The bus clock provides timing for all data as well as all control words. The HS (high speed) controls are those shown in FIG. 11, which control system functions. TIP address is a unique address for addressing each channel in a Terrestrial Interface Port Unit such as shown in FIG. 15. By selecting a TIP, we cause transfer of data through a transmit unit, or open a channel on the receive side of a TIP to receive data coming down the bus from a receiver. Static Control Bus is multiplexed data and addresses used to perform background housekeeping functions (e.g., monitoring status and setting modes in each module by a microprocessor. The signals shown in FIG. 14 are those to normally be found in systems of this type except "TX/RX select phase" which as explained above are used to select the particular modem used to transmit and receive at any time.

Other embodiments may occur to a person of skill in the art. The present invention is to be limited only by the following claims.

What is claimed:

1. A time division multiple access (TDMA) terminal comprising a plurality of terrestrial interface ports, a plurality of TDMA modulators and demodulators for modulating preamble and port data on a carrier and demodulating data from the carrier, the interface ports and the modulators and demodulators being fully interconnected over a common bus arrangement,
a TDMA terminal controller comprising means for sequencing the flow of said data to said modulators and demodulators over said common bus, and said sequencing means comprising means during each time frame for transmitting null addresses to said ports, disabling bus access to the interface ports and transmit/receive units included therein.

2. A terminal as claimed in claim 1 for communicating complete TDMA bursts including sub-bursts directed to said interface ports, said sequencing means comprising means for selectively activating each of said ports.

3. A terminal as claimed in claim 2 wherein said sequencing means selectively activate each of said ports separately for transmitting and for receiving.

4. A terminal as claimed in claim 2 wherein said sequencing means further comprise means for presenting clock timing signals and port address signals repetitively to said ports during each transmission frame to couple said ports to said bus.

5. A terminal as claimed in claim 2 wherein said sequencing means comprises means for generating separate transmit and receive lists of control phase signals, and means for controlling the time of generation of said phase signals by generating additional phase count signals.

6. A time division multiple access (TDMA) terminal comprising a plurality of terrestrial interface ports, a plurality of TDMA modulators and demodulators for modulating preamble and port data on multiple simultaneous carriers and demodulating data from multiple simultaneous carriers, the interface ports and the modulators and demodulators being fully interconnected over a common multiple phase bus arrangement,
and a TDMA terminal controller and said multiple phase bus comprising means for sequencing the flow of said multiple, independent data streams to said modulators and demodulators over said common multiple phase bus.

7. A terminal as claimed in claim 6 for communicating complete multiple simultaneous TDMA bursts to and from a plurality of distant TDMA terminals and demultiplexing data sub-bursts from the total received TDMA bursts and directing these sub-bursts to said interface ports, and sequencing means comprising means for selectively activating each of said ports and independently associating the various ports with the various modulators and demodulators for the transmission and reception of data.

8. A terminal as claimed in claim 7 wherein said sequencing means selectively activate each of said ports separately and independently, and associating a particular bus phase with the data passing between a particular modulator/demodulator and port for transmitting and for receiving.

9. A terminal as claimed in claim 7 wherein said sequencing means further comprise means for presenting the multiple phase clock timing signals and port address signals repetitively to said ports during each transmission frame to independently and simultaneously couple said multiple ports and modems to said multiple phase bus.

10. A terminal as claimed in claim 6 wherein said sequencing means comprises means during each time frame for transmitting multiple phase addressing and null addresses to said ports each of the null addresses being used for disabling bus access to the ports and the transmit/receive units for specific bus phases.

11. A terminal as claimed in claim 10 wherein said multiple phase sequencing mean comprises means for generating separate, simultaneous and independent transmit and receive control phase signals, and means for controlling the time of generation including the simultaneous generation of multiple said signals with a separate set of independent signals available for each bus phase.

12. A terminal as claimed in claim 11 wherein said sequencing means selectively activate each of said ports separately and independently, and associating a particular bus phase with the data passing between a particular modulator/demodulator and port for transmitting and for receiving.

13. A terminal as claimed in claim 10 for communicating complete multiple simultaneous TDMA bursts to and from a plurality of distant TDMA terminals and demultiplexing data sub-bursts from the total received TDMA bursts and directing these sub-bursts to said interface ports, and sequencing means comprising means for selectively activating each of said ports and independently associating the various ports with the various modulators and demodulators for the transmission and reception of data.

14. A terminal as claimed in claim 13 wherein said sequencing means selectively activate each of said ports separately and independently, and associating a particular bus phase with the data passing between a particular modulator/demodulator and port for transmitting and for receiving.

15. A terminal as claimed in claim 14 wherein said sequencing means further comprise means for presenting the multiple phase clock timing signals and port address signals repetitively to said ports during each transmission frame to independently and simultaneously couple said multiple ports and modems to said multiple phase bus.

* * * * *